United States Patent
Hall et al.

(10) Patent No.: US 6,577,687 B2
(45) Date of Patent: *Jun. 10, 2003

(54) METHOD FOR TRANSMITTING DATA OVER A DATA BUS WITH MINIMIZED DIGITAL INTER-SYMBOL INTERFERENCE

(75) Inventors: Dana Hall, Hopkinton, MA (US); Bruce Leshay, West Boylston, MA (US)

(73) Assignee: Maxtor Corporation, Longmont, CO (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 5 days.

(21) Appl. No.: 09/220,089

(22) Filed: Dec. 23, 1998

(65) Prior Publication Data

US 2003/0039326 A1 Feb. 27, 2003

(51) Int. Cl.⁷ .............................................. G04F 13/00
(52) U.S. Cl. ....................................... 375/348; 710/107
(58) Field of Search ................................ 375/346, 348; 710/107, 100

(56) References Cited

U.S. PATENT DOCUMENTS

| | | | |
|---|---|---|---|
| 5,036,408 A | 7/1991 | Leis et al. ................ 360/48 |
| 5,623,518 A | 4/1997 | Pfiffner ................... 375/278 |
| 5,758,188 A | * 5/1998 | Appelbaum et al. .......... 710/35 |
| 5,949,253 A | 9/1999 | Bridgewater, Jr. ........... 326/86 |
| 5,953,521 A | * 9/1999 | Dabral et al. .............. 713/401 |
| 6,243,366 B1 | * 6/2001 | Bradley et al. ............. 370/318 |
| 6,243,779 B1 | * 6/2001 | Devanney et al. ........... 710/129 |

FOREIGN PATENT DOCUMENTS

| JP | 110003135 A | 12/1987 | ............ G06F/13/42 |
|---|---|---|---|
| JP | 62081047 A | 1/1999 | ............. G06F/1/12 |

* cited by examiner

Primary Examiner—Chi Pham
Assistant Examiner—Kevin M Burd
(74) Attorney, Agent, or Firm—David M. Sigmond

(57) ABSTRACT

A method for transmitting data over a data bus with minimized digital control and data inter-symbol interference. The voltage level on the data bus is not permitted to reach the quiescent negated voltage level set by the bus terminator voltage. Additional time is provided for data detection circuitry to detect a first segment of data transferred over the data bus. A pause time is enabled after the data bus has been idle or paused for a prolonged period. After the first segment of data has been transferred, the method returns to normal operation by pausing for a normal period of time for data detection circuitry to detect subsequent segments of data transferred over the data bus. Additionally, during prolonged synchronous data transfers with unchanged data bits, the data bus is inverted and driven for further regulating the data bus voltage.

61 Claims, 7 Drawing Sheets

METHOD FOR TRANSMITTING DATA OVER A DATA BUS WITH MINIMIZED DIGITAL INTER-SYMBOL INTERFERENCE

FIELD OF THE INVENTION

The invention relates generally to transmitting binary data over a data transmission line and more precisely to transmitting binary data over a data transmission line with minimized digital inter-symbol interference.

BACKGROUND OF THE INVENTION

As illustrated in FIG. 1, data is typically transmitted back and forth between a host computer system 10 and peripheral devices, such as disk drive 5, tape drive 6, or printer 7, over a data bus 15. The data bus 15 couples the host computer system 10 and the peripheral devices together and enables the exchange of data between the system and the devices. One type of data bus is a Small Computer System Interconnect (SCSI) data bus. A SCSI data bus can be configured in different ways and has several modes of operation. One configuration and mode of operation is known as SCSI wide bus which includes a sixteen bit data bus with associated control signals such as Busy (BSY), Select (SEL), Control/Data (C/D), Input/Output (I/O), Message (MSG), Request (REQ), Acknowledge (ACK), Attention (ATN), and Reset (RST). The SCSI data bus 15 is connected to the host computer system 10 via a host adapter 12 and is connected to disk drive 5, tape drive 6, and printer 7 via disk controller 8, tape controller 9, and printer controller 11, respectively. The device controller is matched to the specific type of device connected to the SCSI bus as shown in FIG. 1. The data bus 15 may be configured to include a plurality of peripheral devices daisy chained together, where both the host computer system 10 and the last device connected to the data bus 15 (furthest from the host) are terminated with a bus terminator 16. The bus terminator 16 includes circuitry for regulating the maximum and the minimum voltage levels on the data bus 15.

Referring to FIGS. 2A and 2B, the maximum and minimum voltage thresholds for data detection (V-one and V-zero) are sensed by data detection circuitry 13. Each threshold is a fixed d.c. voltage level connected to a signal line of the data bus 15, which is driven by driver circuitry 14. This fixed d.c. threshold level is typically defined between the terminator voltage boundaries (+V-term and −V-term). Both the host adapter and the device controllers contain driver circuitry 14 for driving, and data detection circuitry 13 for receiving, the data and logic circuits (not shown in FIG. 2A) for directing data flow and processing operations.

When information is transferred between the host computer system and any one of the plurality of peripheral devices, a handshaking protocol is used to initiate data requests and acknowledge that such requests have been completed. A REQ control signal may be asserted by an initiating device to request that the target either write or read data to/from the initiating device. An ACK control signal may be asserted by the target device to acknowledge that the target device successfully sent or received data.

A problem can occur when the SCSI data bus idles with no data transfers for a prolonged period of time. In this instance the voltage level on the data bus will rise to the maximum voltage value defined by the bus terminators, called herein the "quiescent negated voltage level." When a REQ is asserted, the REQ control circuitry provides a predetermined fixed window of time for the REQ to be sensed by the data detection circuitry before subsequent REQs are asserted. Since the bus voltage is at the quiescent negated voltage level during prolonged idles, the REQ must make a larger signal level swing than during synchronous operation in order to reach a level capable of being sensed as a REQ by the data detection circuitry. In one failure mode, there is insufficient time for the REQ signal to be sensed by the data detection circuitry during a first assertion of REQ before a subsequent REQ is asserted. Consequently, REQ data transmitted on other lines of the data bus during the first REQ pulse may not be sensed correctly by the data detection circuitry and may be lost. A second failure mode occurs when the REQ signal is not sensed at all by the data detection circuit within predetermined time constraints. These failure modes are hereby defined as digital control inter-symbol interference, i.e., "control ISI."

The above described problems which can occur during the first REQ assertion are not relevant to subsequent REQs because the data bus voltage level is no longer at the quiescent negated voltage level and thus subsequently transmitted REQs do not require as large a voltage swing before being sensed by the data detection circuitry.

Referring to FIG. 3, a similar problem occurs when the user data signal is unchanged (all zeros or ones) for a prolonged period of time. A prolonged unchanged user data signal allows the user data voltage level to approach the quiescent negated voltage level. Subsequent transitions in the user data signal from the quiescent negated voltage level require a large voltage swing in the data signal in order to be sensed by the data detection circuitry. Again, there is a fixed period of time for these data signal transitions to be sensed by the data detection circuitry before another signal transition is asserted. However, this period of time is often insufficient for the first data signal transition to be sensed by the data detection circuitry, thereby causing the data defined within this first large data signal transition to be lost. This loss of user data occurring within the first user data transition is hereby defined as digital data inter-symbol interference ("data ISI").

In transmitting data over a data bus, the trend is to increase the frequency at which information can be transferred over the data bus. However, an increase in data frequency causes a proportional decrease in the time period allowable for control and data pulses to be sensed by the data detection circuitry. Therefore, as data transmission frequencies are increased, there is a corresponding increase in both control ISI as well as data ISI as defined above. Minimizing both control and data ISI is thus highly desirable.

SUMMARY OF THE INVENTION

An object of the present invention is to transmit data over a data bus with minimized digital control inter-symbol interference.

Another object of the present invention is to transmit data over a data bus with minimized digital data inter-symbol interference.

A first embodiment of the present invention comprises a method for transmitting data from a sending device (sender) to a receiving device (receiver) via a data bus in a manner to minimize control and data inter-symbol interference. The method comprises the steps of executing a start data transfer command, waiting for a FIFO register to contain data, the FIFO register being coupled to a peripheral device, determining when the FIFO register is holding the data, driving the data held in the FIFO register onto the data bus, inverting the data previously driven onto the data bus to reduce the quiescent negated voltage level of the data bus, driving the inverted data onto the data bus, pausing for a predetermined period of time (t3), driving true data onto the data bus, pausing for a predetermined period of time (t1), asserting a REQ control signal, and pausing a predetermined period of time, (t2), for the data to be sensed by the data detection circuitry. The step of pausing for the predetermined period of time, t2, provides the data detection circuitry additional time to sense the data being transmitted on the data bus, thereby minimizing digital control inter-symbol interference during data transmission from the sender to the receiver.

This method transmits data over the data bus with minimized digital control and data inter-symbol interference because the voltage level on the data bus is not permitted to reach the quiescent negated voltage level (the bus terminator voltage level) before a transition occurs. Even after a prolonged period of time where data signals transmitted over the data bus have remained constant, an abrupt transition is not subjected to the lengthy transition necessitated by the bus floating at the quiescent negated voltage level. Moreover, additional time is provided for the first REQ pulse to be detected before subsequent REQ pulses are asserted. Accordingly, the first level transition occurring after the prolonged unchanged data transmission level is detected by the data detection circuitry within predefined data detection circuitry time constraints.

These and other objects, advantages, aspects and features of the present invention will be more fully understood and appreciated upon consideration of the following detailed description of a preferred embodiment, presented in conjunction with the accompanying drawings.

DETAILED DESCRIPTION OF PREFERRED EMBODIMENTS

Figure 1:
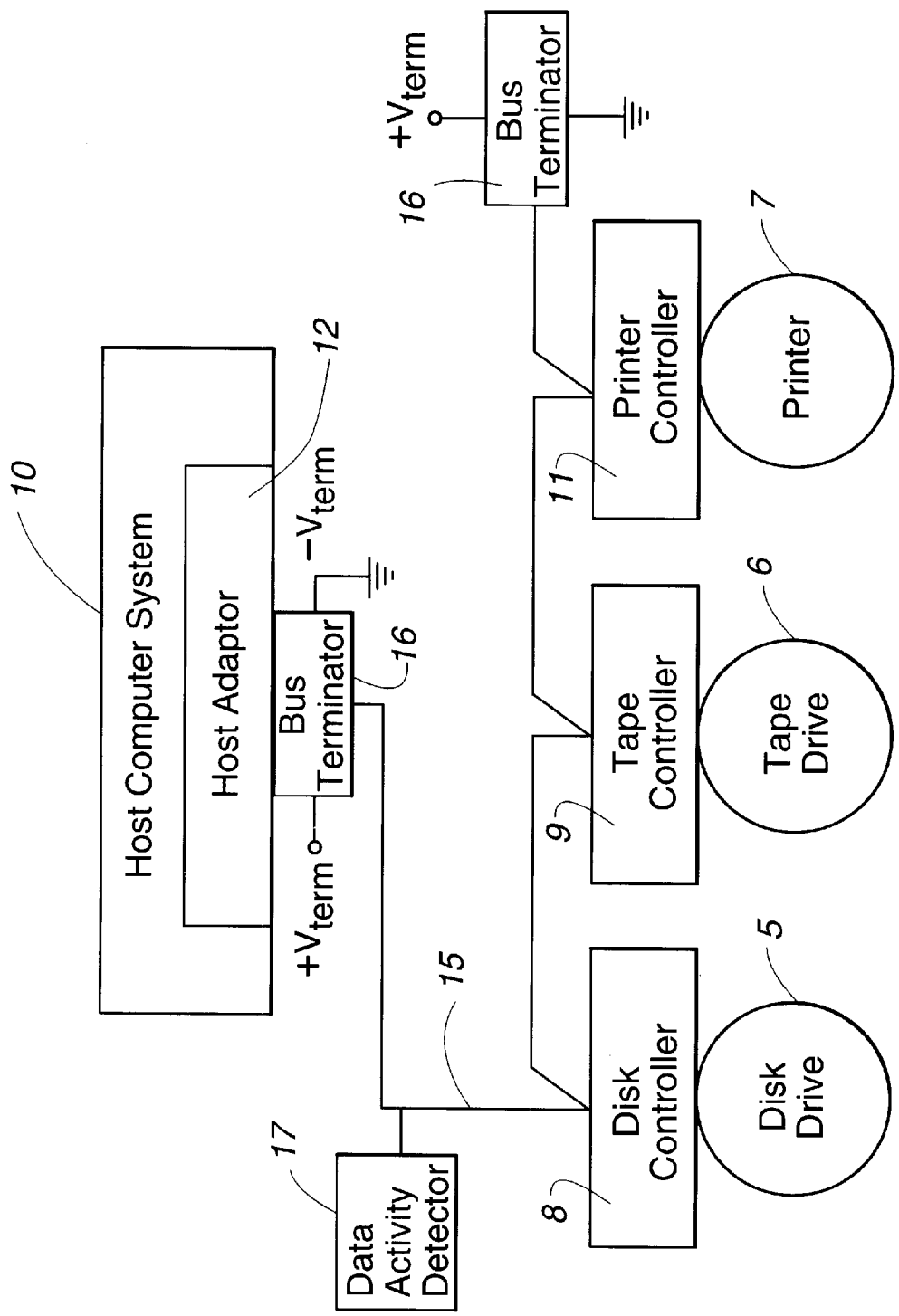
FIG. 1 is a block diagram of a host computer system incorporating a preferred embodiment of the present invention.
Figure 2A:
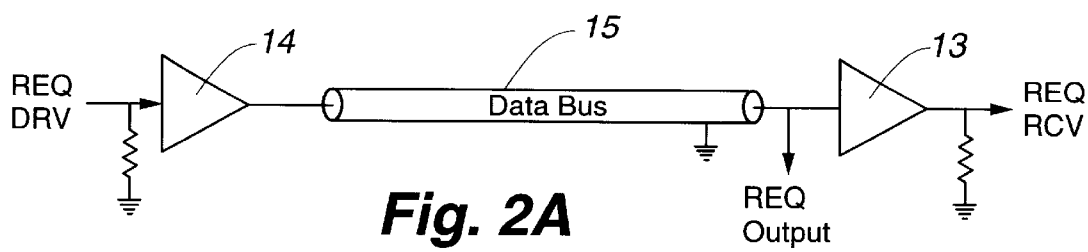
FIG. 2A is a circuit diagram of a conventional single data signal path between a sending device and a receiving device on the FIG. 1 bus.
Figure 2B:
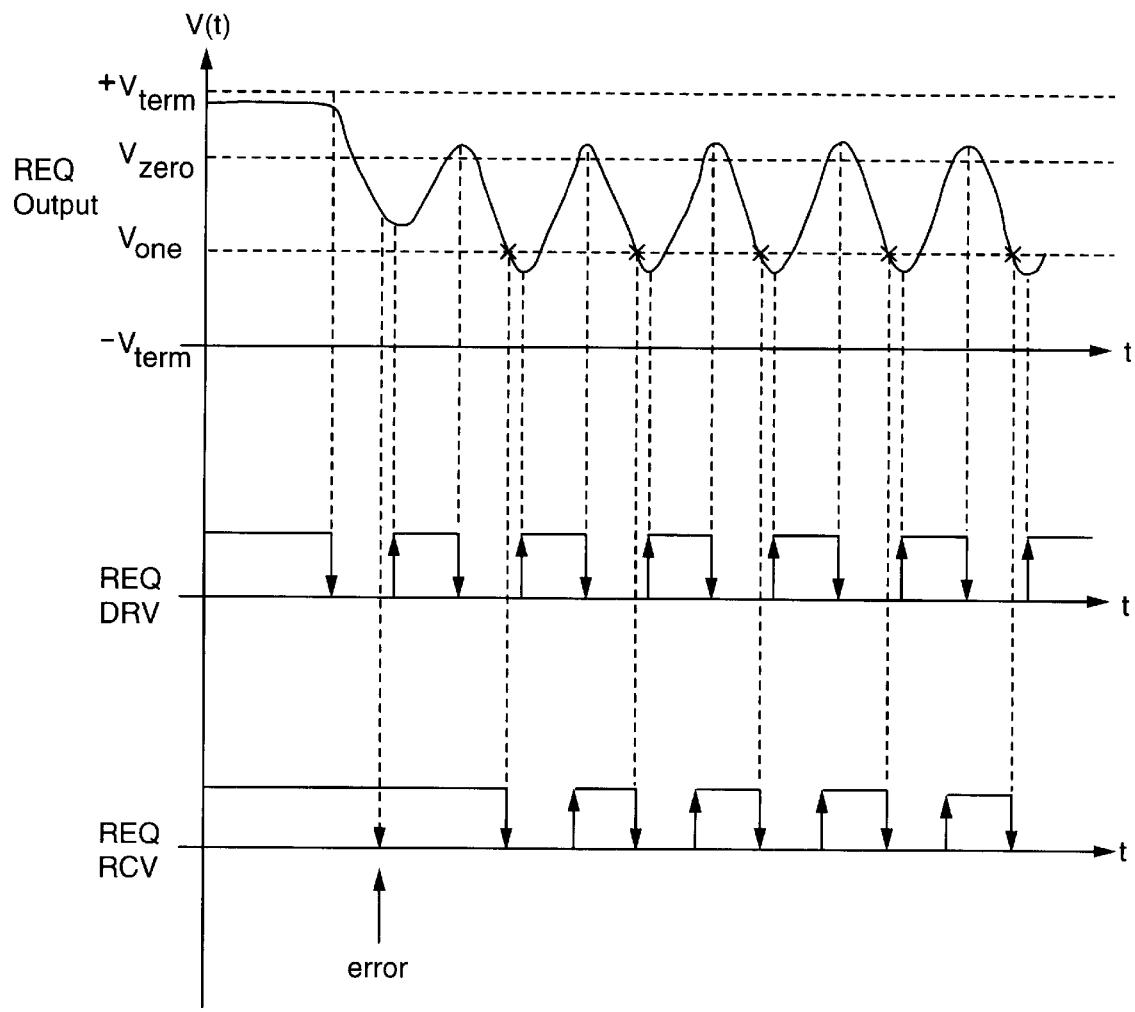
FIG. 2B is signal flow diagram illustrating a REQ data signal error conventionally transmitted over a data bus.
Figure 3:
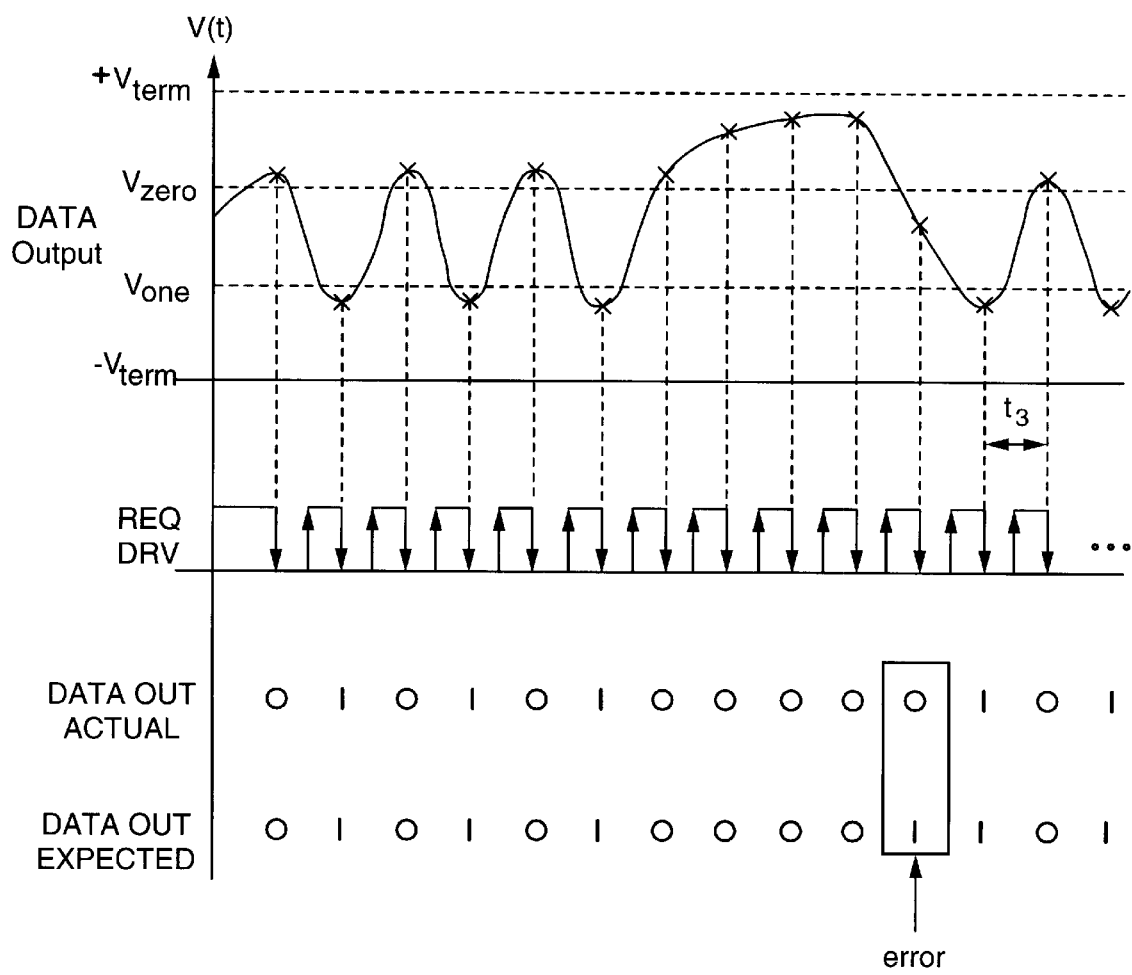
FIG. 3 is signal flow diagram illustrating a user data signal error conventionally transmitted over a data bus.

Referring again to FIG. 1, generally, the present invention comprises a method for bi-directionally transmitting data from a sender to a receiver via a data bus 15. In one instance, the sender is defined as a host computer system 10 and the receiver is defined as a peripheral device such as the disk drive 5 for transmitting data from the host computer system 10 to the disk drive 5. Alternatively, the sender is defined as a peripheral device such as the disk drive 5 and the receiver is defined as the host computer system 10 for transmitting data from the disk drive 5 to the host computer system 10.

Figure 4:
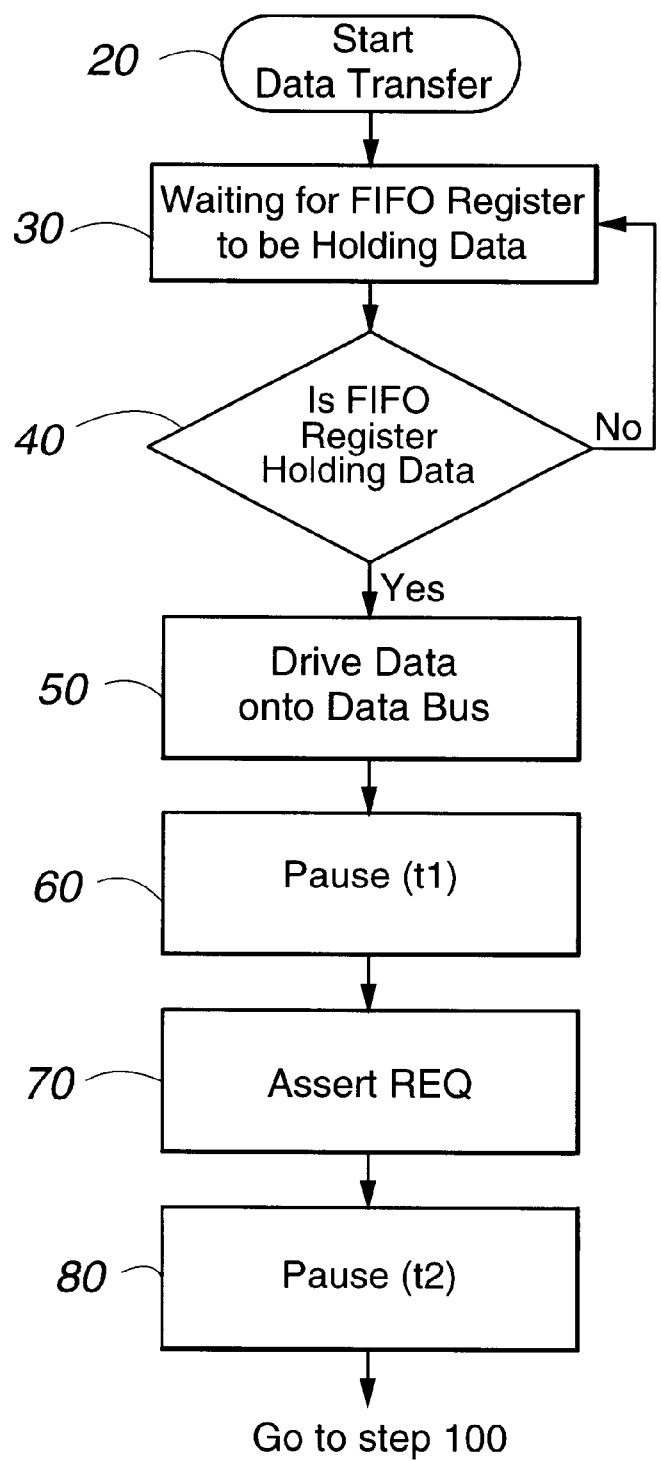
FIG. 4 is a process flow diagram illustrating the method steps for transmitting data from a sender to a receiver according to principles of the present invention.

One preferred embodiment of the present invention as set forth herein is a method for transmitting data from the disk drive 5 to the host computer system 10 via the data bus 15, such as a SCSI data bus, with minimized digital inter-symbol interference. Referring to FIG. 4, the method comprises the steps of executing a start data transfer command at step 20 from the disk drive 5 to the requesting host computer system 10. The disk drive 5 waits for a FIFO register (not shown) to be holding data at step 30. The FIFO register is physically associated or positioned with the disk drive 5. Once data is detected as being held in the FIFO register at step 40, the data held in the FIFO register is driven onto the data bus 15 at step 50. At step 60 the operation pauses for a first predetermined period of time, t1, for the data to be set-up on the data bus 15, whereby a subsequent assertion of a REQ command at step 70 transfers data from the sender to the receiver. The first predetermined period of time typically ranges from approximately 12.5 nanoseconds to 25 nano-seconds.

Figure 5:
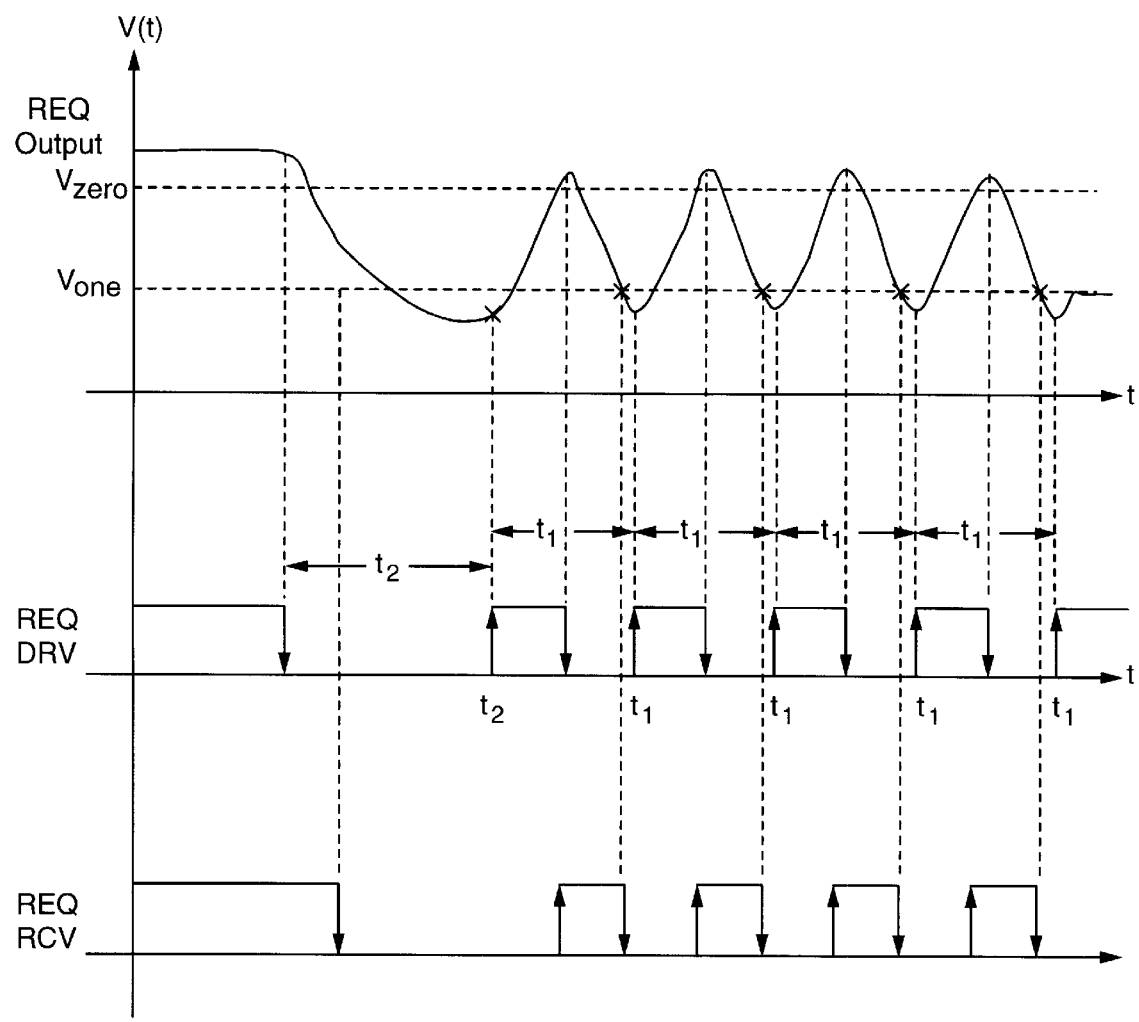
FIG. 5 is signal flow diagram illustrating a REQ data signal transmitted over a data bus according to principles of the present invention.

Since the REQ command has been asserted after a period of no data transmissions, the next step is to pause for a second predetermined period of time, t2 at step 80, so that the REQ pulse transition can be sensed by the data detection circuitry 13 and data associated therewith reliably sampled. The second predetermined period of time typically ranges from approximately 25 nano-seconds to 50 nano-seconds. As illustrated in FIG. 5 this second period of time, t2, is substantially longer in duration than typical pauses that are interleaved between subsequent synchronous data transmissions, e.g. t1. The period of time, t2, is substantially longer in order to provide the data detection circuitry 13 additional time to sense the first REQ data signal transition and to accurately sample the REQ data transferred over the data bus 15. In this manner, data transmission over the data bus 15 is accomplished with minimized digital control inter-symbol interference. After the first REQ data signal transition has been sensed, the voltage level of the REQ data signal will be lower than the quiescent negated voltage level and thus additional time is not necessary for subsequent REQ data to be sensed.

Figure 6:
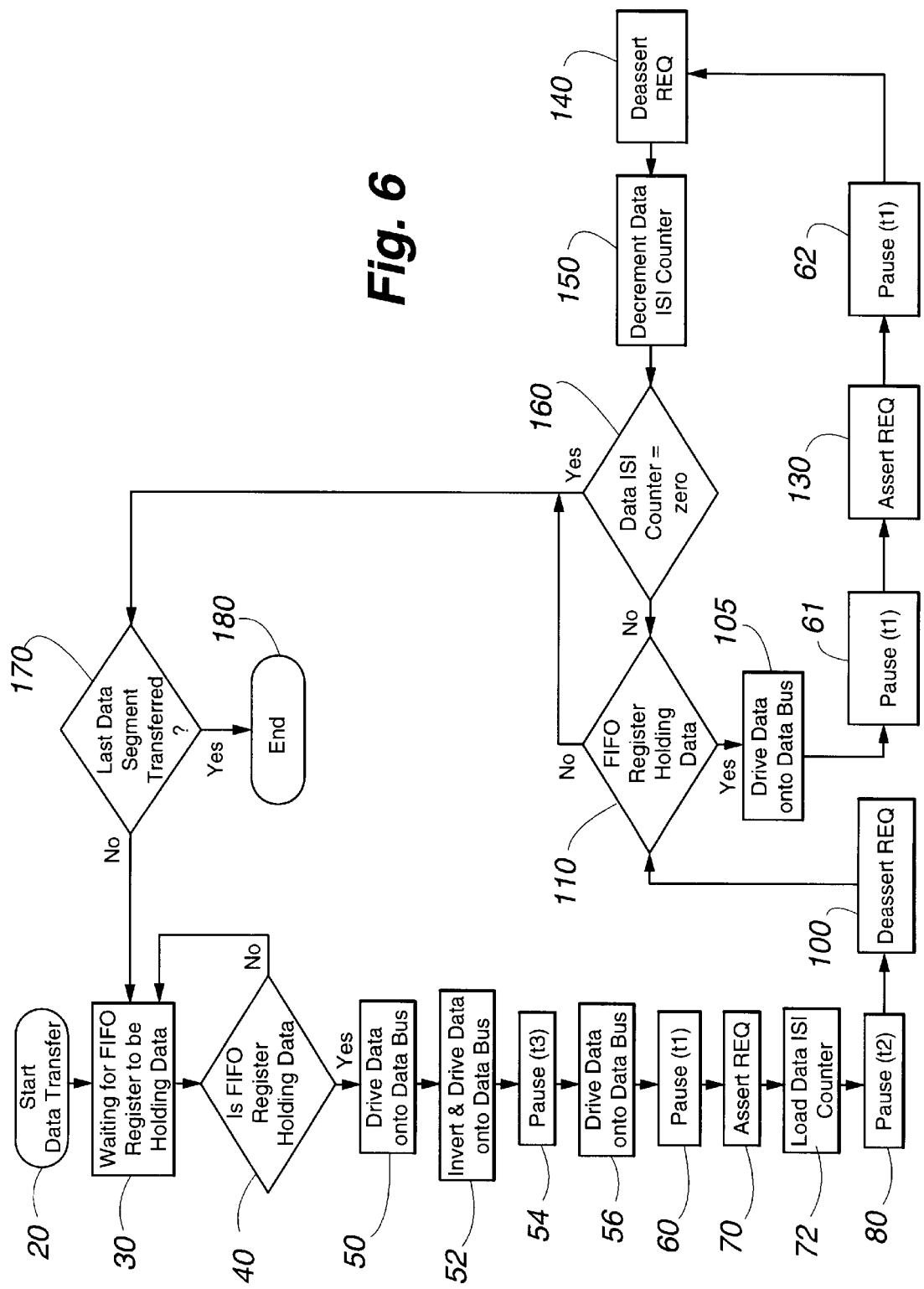
FIG. 6 is an expanded process flow diagram illustrating the method steps for transmitting data from a sender to a receiver according to another embodiment of the present invention.
Figure 7:
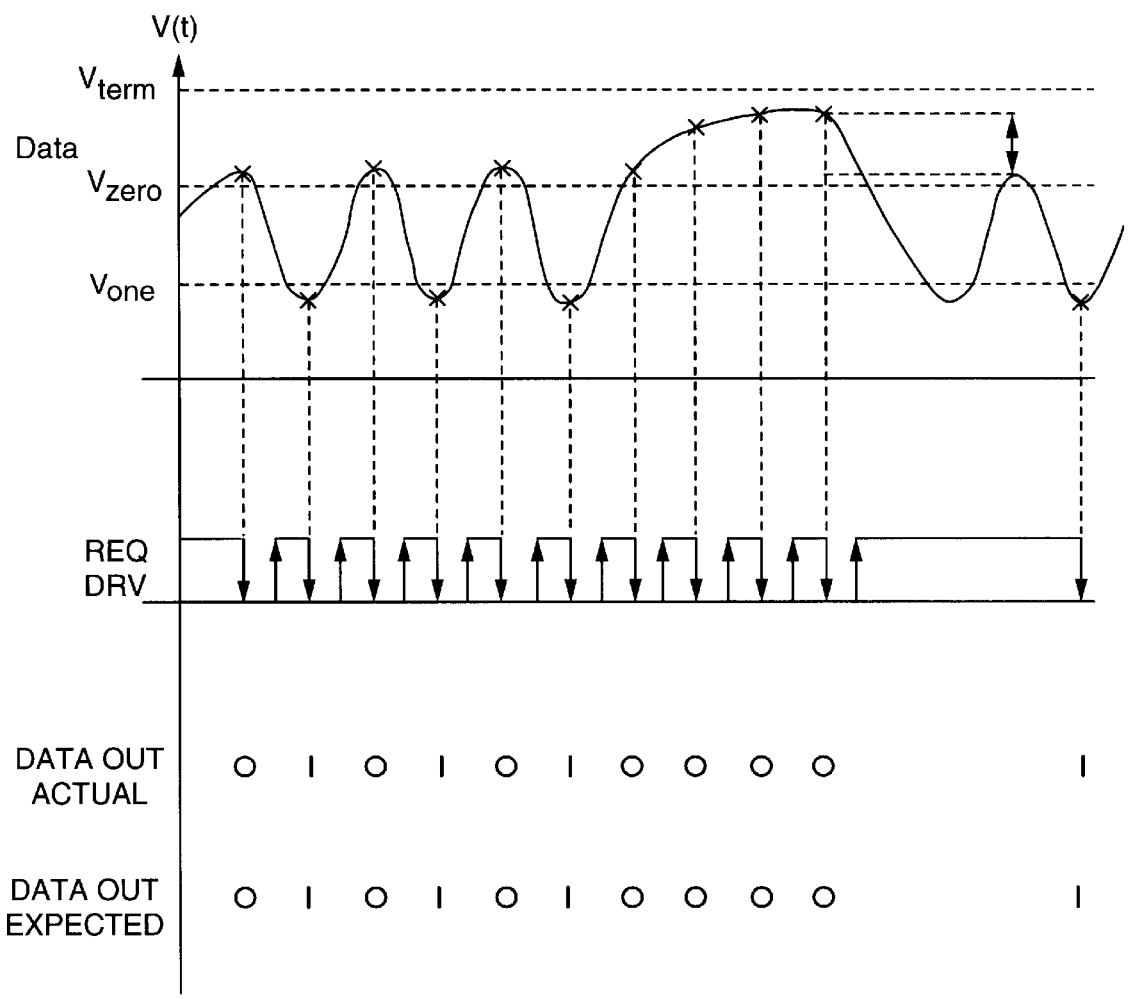
FIG. 7 is signal flow diagram illustrating a user data signal transmitted over a data bus according to principles of the present invention.

Referring to FIGS. 6 and 7, another preferred embodiment of the present invention adds additional steps to the FIG. 4 flow chart and further comprises loading a data ISI counter at step 72 after asserting a REQ in step 70. The data ISI counter counts the number of data segments transmitted over the data bus 15. After a predetermined number of data ISI counter count cycles and if there is still data to be transferred, the process steps restart at step 30.

The method steps of this embodiment further include the steps of inverting and driving the data onto the data bus 15 at step 52, that had been previously driven onto the data bus 15 in step 50. Then the process is paused for a third predetermined period of time, t3 at step 54 to insure that the data bus 15 voltage level does not reach the quiescent negated voltage level during subsequent steps of driving true data onto the data bus 15 at step 56. The third predetermined period of time typically ranges from approximately 12.5 nanoseconds to 25 nano-seconds. Moreover, during subsequent steps of driving true data onto the data bus 15 at step 56, the data bus voltage does not reach the quiescent negated voltage level for a predetermined period of time as defined by the data ISI counter in step 72. This reduction in the quiescent negated voltage level of the data bus 15, achieved at steps 52–56, enables subsequent data segments transmitted over the data bus 15 to be sensed faster by the data detection circuitry 13. The subsequent data segments are detected faster because the voltage level on the data bus 15 is lower than the quiescent negated voltage level as shown in FIG. 7. Therefore, subsequent data segment transitions comprise smaller voltage swings before being detected by the data detection circuitry 13. These smaller voltage swings made by data transitions are more likely to be detected within time constraints of the data detection circuitry 13 than data transitions that make larger voltage swings.

The subsequent data segments transmitted over the data bus 15 follow the method steps of: deasserting the REQ drive command at step 100 and then determining if the FIFO register is holding data at step 110. If the FIFO register is still holding data, then driving the data held in the FIFO register onto the data bus 15 at step 105, and then pausing for a predetermined period of time, t1 at step 61, for data to be set up on the data bus 15, i.e., set up time.

Thereafter, the REQ pulse is asserted at step 130 by the disk drive 5 for transferring a data segment in response to a data request by the host computer system 10 for the next data segment. Accordingly, the data is transmitted from the disk drive 5 to the host computer system 10 over the data bus 15. Then the step of pausing for a period of time, t1 at step 62, is carried out so that data held on the data bus 15 can be sensed by the data detection circuitry 13, i.e., hold time. In one preferred implementation, the set up time equals the hold time, however equality is not required. Next, the REQ drive command is deasserted at step 140. Then, the data ISI counter is decremented at step 150 and the data ISI counter is checked at step 160 to determine if the counter has reached zero. The FIFO register is again checked at step 110 to determine whether the FIFO register is holding data.

Further, if the FIFO register is again determined to be holding data at step 110, then the method steps 105, 61, 130, 62, 140, 150, and 160 described above are repeated, if the data ISI counter is not zero at step 160 and the FIFO register is still holding data at step 110, then these steps 105, 61, 130, 62, 140, 150, and 160 described above are cyclically repeated until the FIFO register is determined not be holding data at step 110 or the data ISI counter is equal to zero as determined at step 160.

Conversely, if it is determined that the FIFO register is not holding data at step 110, then it is determined if the last data segment has been transferred at step 170. If the last data segment has been transferred, then the data transfer method ends at step 180. If, however, the last data segment has not been transferred, then the data transfer method again waits for the FIFO register to be holding data at step 30 and repeats the FIG. 6 steps for transferring data over the data bus 15.

Additionally, if the data ISI counter is equal to zero as determined at step 160, then it is again determined if the last data segment has been transferred at step 170. If the last data segment has been transferred, then the data transfer method ends at step 180. If, however, the last data segment has not been transferred, then the data transfer method again waits for the FIFO register to be holding data at step 30 and repeats the FIG. 6 steps for transferring data over the data bus 15, until all of the data has been transferred.

It is important to note that the pause for a period of time, t2 at step 80, is longer in duration than the pause for a period of time, t1 at step 60. The pause period, t2 at step 80, is asserted for the initial data segment transferred over the data bus 15 as illustrated in FIG. 5. Additionally, the pause period, t2 at step 80, is also asserted when data transfers over the data bus 15 are paused for any reason or if the data ISI counter equals zero at step 160. In summary, the pause period, t2 at step 80, is asserted during initial start data transfers at step 20; when the data transfers are paused for any reason; or when the data ISI counter equals zero at step 160. The pause period, t1 at step 60, is asserted during synchronous data segment transfers.

The data ISI counter (not shown) is a programmable register that may be programmed to count data segments over a range of approximately 1 to 31 counter count cycles. Each count cycle represents a data segment transmitted over the data bus 15. Thus, once the data ISI counter has decremented to zero, the above described method steps are again restarted at the steps of determining if the last data segment has been transferred at step 170 and if so then ending at step 180 and if not then waiting for the FIFO register to be holding data at step 30 and restarting the data transfer process.

This restart of the data transfer process causes the data lines of the data bus 15 to be cleared of digital control/data inter-symbol interference after a predetermined number of counter count cycles in accordance with the pre-programmed data ISI counter value. Likewise, a restart occurs if the FIFO register is determined to be no longer holding data in step 110 and if it is determined in step 170 that the last data segment has not been sent. Therefore, if either the data ISI counter has reached zero in step 160 or if the last data segment has not been sent in step 170, then the method for transferring data over the data bus 15 restarts at the step of waiting for the FIFO register to be holding data at step 30.

Referring again to FIG. 1, another aspect of the invention includes the step of individually monitoring each data line of the data bus 15 with a 16-bit data activity detector 17. The data activity detector 17 is connected to each of the data lines defined within the data bus 15. When a monitored line is inactive for a period of time, the FIG. 6 method steps are repeated for each individual data line of the data bus 15.

Referring to FIGS. 1–7, a method for transmitting data from the host computer system 10 to a peripheral device via the data bus 15 comprises the method steps of replacing the REQ command with an ACK command and repeating the method steps described above.

The above described method for transmitting data over a data bus has many advantages over the prior art, such as, starting data transfers on a data bus, after the data bus has been at idle for a prolonged period of time, with minimized inter-symbol interference.

Another advantage of the above described method for transmitting data over a multi-line data bus is directed to synchronously transmitting data over the data bus with minimized digital data inter-symbol interference even though any one of the data lines has remained in an unchanged state for a prolonged period of time.

The data transfer rate, according to principle of the present invention, can be increased because the data bus need not compensate for digital control inter-symbol interference realized after restarting the data bus after prolonged periods of time at idle. Moreover, the data transfer rate of the data bus can be increased because the data bus need not compensate for digital data intersymbol interference realized after prolonged synchronous data transfers of unchanged data values.

Having thus described an embodiment of the invention, it will now be appreciated that the objects of the invention have been fully achieved, and it will be understood by those skilled in the art that many changes in construction and widely differing embodiments and applications of the invention will suggest themselves without departing from the spirit and scope of the invention. The disclosure and the description herein are purely illustrative and are not intended to be in any sense limiting.

What is claimed is:

1. A method for controlling transmission of data from a sender to a receiver via a data bus to minimize digital inter-symbol interference, comprising the steps of:
   (A) executing a start data transfer command;
   (B) waiting for a FIFO register at the sender to be holding the data and determining when the FIFO register is holding the data;
   (C) driving the data held in the FIFO register onto the data bus;
   (D) pausing a first predetermined period of time for the data to be set up on the data bus;
   (E) asserting a REQ command associated with the data onto the data bus; and then
   (F) pausing a second predetermined period of time longer than the first predetermined period of time for the data to be sensed by data detection circuitry in the receiver, wherein pausing for the second predetermined period of time provides the data detection circuitry additional time to sense the data being transmitted on the data bus;
   wherein after step (C) and before step (D) the method further comprises the steps of:
   (G) inverting the data driven onto the data bus in step (C);
   (H) pausing a third predetermined period of time so that a quiescent negated voltage level is not reached on the data bus during subsequent steps of driving the data; and then
   (I) driving the data onto the data bus.

2. The method of claim 1, wherein after step (E) the method further comprising the steps of:
   (J) loading a data ISI counter with a predetermined count value; and
   after step (F), the method further includes the steps of:
   (K) deasserting the REQ command;
   (L) determining if the FIFO register is holding the data,
      (i) if the FIFO register is holding the data then continuing on to step (M),
      (ii) if the FIFO register is not holding the data then determining if the last data segment has been transferred,
      (iii) if it is determined that a last data segment of the data has been transferred then ending, and
      (iv) if it is determined that the last data segment has not been transferred then repeating step (B);
   (M) driving a segment of the data held in the FIFO register onto the data bus;
   (N) pausing the first predetermined period of time for the data to be sensed by the data detection circuitry;
   (O) asserting a REQ command for transferring a data segment;
   (P) repeating step (N);
   (Q) deasserting the REQ command;
   (R) decrementing the data ISI counter; and
   (S) determining if the data ISI counter is zero,
      (v) if it is determined that the data ISI counter is zero then determining if the last data segment has been transferred, and
      (vi) repeating steps (iii) and (iv).

3. The method of claim 2, wherein steps (L)–(S) are cyclically repeated until it is determined in step (S) that the last data segment has been transferred.

4. The method of claim 2, wherein steps (L)–(S) are cyclically repeated until it is determined in step (S) that the data ISI counter is equal to zero.

5. The method of claim 2, wherein the data ISI counter may be programmed over a range of approximately 1 to 31 counts.

6. The method of claim 1, wherein the data bus is a SCSI data bus.

7. The method of claim 1, wherein the data bus comprises a plurality of individual data lines and a data activity detector is connected to the data bus for monitoring data segment transfers on each individual data line of the data bus.

8. The method of claim 7, wherein steps (A)–(F) are repeated for each individual data line if the data activity detector determines that any individual data line is inactive for a period of time.

9. The method of claim 1, wherein the sender is a host computer system and the receiver is a peripheral device.

10. The method of claim 1, wherein the sender is a peripheral device and the receiver is a host computer system.

11. The method of claim 2, wherein the REQ command is replaced with an ACK command and the sender is a host computer system and the receiver is a peripheral device.

12. A method of transmitting data from a sender to a receiver over a data bus, comprising the following steps in the sequence set forth:
   the sender sending the data onto the data bus by sending the data as true data onto the data bus, then sending the data as inverted data onto the data bus, and then sending the data as true data onto the data bus;
   the sender pausing a first predetermined period of time for the data to be set up on the data bus;
   the sender sending a REQ command associated with the data onto the data bus; and
   the sender pausing a second predetermined period of time, which is longer than the first predetermined period of time, for the REQ command to be set up on the data bus.

13. The method of claim 12, wherein the sender pauses the second predetermined period of time for the REQ command to be set up on the data bus in response to the sender sending the data onto the data bus after a prolonged period of no data transmission on the data bus, and the sender pauses for less than the second predetermined period of time for the REQ command to be set up on the data bus in response to the sender sending the data onto the data bus after the beginning of and as part of a synchronous data transmission on the data bus.

14. The method of claim 12, wherein the second predetermined period of time is substantially longer than the first predetermined period of time.

15. The method of claim 12, wherein the second predetermined period of time is long enough to minimize digital control inter-symbol interference, and the first predetermined period of time is not long enough to minimize digital control inter-symbol interference.

16. The method of claim 12, wherein the data bus is a SCSI data bus.

17. The method of claim 12, wherein the sender is one of a host computer system and a peripheral device, and the receiver is the other of the host computer system and the peripheral device.

18. The method of claim 17, wherein the peripheral device is a disk drive.

19. A method of transmitting data from a sender to a receiver over a data bus, wherein the sender is one of a host computer system and a peripheral device, and the receiver is the other of the host computer system and the peripheral device, comprising the following steps in the sequence set forth:

the sender sending the data onto the data bus by sending the data as true data onto the data bus, then sending the data as inverted data onto the data bus, and then sending the data as true data onto the data bus;

the sender pausing a first predetermined period of time for the data to be set up on the data bus;

the sender sending a REQ command associated with the data onto the data bus; and the sender pausing a second predetermined period of time for the REQ command to be set up on the data bus in response to the sender sending the data onto the data bus after a prolonged period of no data transmission on the data bus, and the sender pausing a third predetermined period of time for the REQ command to be set up on the data bus in response to the sender sending the data onto the data bus after the beginning of and as part of a synchronous data transmission on the data bus, wherein the second predetermined period of time is substantially longer than the first predetermined period of time, and the third predetermined period of time is not substantially longer than the first predetermined period of time.

20. The method of claim 19, wherein the second predetermined period of time is approximately twice as long as the first predetermined period of time.

21. The method of claim 19, wherein the third predetermined period of time is identical to the first predetermined period of time.

22. The method of claim 19, wherein the second predetermined period of time is long enough to minimize digital control inter-symbol interference, and the third predetermined period of time is not long enough to minimize digital control inter-symbol interference.

23. The method of claim 19, wherein the sender pauses for the second predetermined period of time for the REQ command to be set up on the data bus in response to an individual line of the data bus being inactive for a period of time during a synchronous data transmission on the data bus.

24. The method of claim 19, wherein the sender pauses for the second predetermined period of time for the REQ command to be set up on the data bus in response to a predetermined number of data segments of the data being transmitted over the data bus during a synchronous data transmission on the data bus.

25. The method of claim 19, wherein the peripheral device is a disk drive.

26. The method of claim 19, wherein the peripheral device is a tape drive.

27. The method of claim 19, wherein the peripheral device is a printer.

28. A method of transmitting data from a sender to a receiver over a SCSI data bus, wherein the sender is one of a host computer system and a peripheral device, and the receiver is the other of the host computer system and the peripheral device, comprising the following steps in the sequence set forth:

the sender sending the data onto the data bus including the following steps in the sequence set forth:

the sender sending the data as true data onto the data bus;

the sender sending the data as inverted data onto the data bus;

the sender pausing a third predetermined period of time for the inverted data to be set up on the data bus; and the sender sending the data as true data onto the data bus;

the sender pausing a first predetermined period of time for the data to be set up on the data bus;

the sender sending a REQ command associated with the data onto the data bus; and the sender pausing a second predetermined period of time for the REQ command to be set up on the data bus in response to the sender sending the data onto the data bus after a prolonged period of no data transmission on at least one individual data line of the data bus, and the sender pausing the first predetermined period of time for the REQ command to be set up on the data bus in response to the sender sending the data onto the data bus after the beginning of and as part of a synchronous data transmission on the data bus, wherein the second predetermined period of time is substantially longer than the first predetermined period of time.

29. The method of claim 28, wherein the second predetermined period of time is approximately twice as long as the first predetermined period of time.

30. The method of claim 28, wherein the second predetermined period of time is in the range of approximately 25 to 50 nano-seconds, and the first predetermined period of time is in the range of approximately 12.5 to 25 nano-seconds.

31. The method of claim 28, wherein the second predetermined period of time is long enough to minimize digital control inter-symbol interference, and the first predetermined period of time is not long enough to minimize digital control inter-symbol interference.

32. The method of claim 28, wherein the sender pauses for the second predetermined period of time for the REQ command to be set up on the data bus in response to an individual line of the data bus being inactive for a period of time during a synchronous data transmission on the data bus.

33. The method of claim 28, wherein the sender pauses for the second predetermined period of time for the REQ command to be set up on the data bus in response to a predetermined number of data segments of the data being transmitted over the data bus during a synchronous data transmission on the data bus.

34. The method of claim 28, wherein the peripheral device is a disk drive.

35. The method of claim 28, wherein the peripheral device is a tape drive.

36. The method of claim 28, wherein the peripheral device is a printer.

37. A method of transmitting data from a sender to a receiver over a data bus, wherein the sender is one of a host computer system and a peripheral device, and the receiver is the other of the host computer system and the peripheral device, comprising the following steps in the sequence set forth:

the sender sending the data as true data onto the data bus;

the sender sending the data as inverted data onto the data bus;

the sender pausing a first predetermined period of time for the inverted data to be set up on the data bus;

the sender sending the data as true data onto the data bus;

the sender pausing a second predetermined period of time for the data to be set up on the data bus;

the sender sending a REQ command associated with the data onto the data bus; and the sender pausing a third predetermined period of time for the REQ command to be set up on the data bus, wherein the third predetermined period of time is longer than the second predetermined period of time.

38. The method of claim 37, wherein the third predetermined period of time is longer than the first predetermined period of time.

39. The method of claim 37, wherein the second predetermined period of time is identical to the first predetermined period of time.

40. The method of claim 37, wherein the sender sending the inverted data and pausing the first predetermined period of time for the inverted data to be set up on the data bus minimizes digital data inter-symbol interference, and the sender sending the true data and pausing the second predetermined period of time for the true data to be set up on the data bus does not minimize digital data inter-symbol interference.

41. The method of claim 37, wherein the sender sending the REQ command and pausing the third predetermined period of time for the REQ command to be set up on the data bus minimizes digital control inter-symbol interference, and the sender sending the REQ command and pausing the second predetermined period of time for the REQ command to be set up on the data bus does not minimize digital control inter-symbol interference.

42. The method of claim 37, wherein the sender pauses for the third predetermined period of time for the REQ command to be set up on the data bus in response to the data bus being idle for a prolonged period of time.

43. The method of claim 37, wherein the sender pauses for the third predetermined period of time for the REQ command to be set up on the data bus in response to an individual line of the data bus being idle for a prolonged period of time during a synchronous data transmission on the data bus.

44. The method of claim 37, wherein the sender pauses for the third predetermined period of time for the REQ command to be set up on the data bus in response to a prolonged synchronous data transmission on the data bus.

45. The method of claim 37, wherein the data bus is a SCSI data bus.

46. The method of claim 37, wherein the peripheral device is a disk drive.

47. A method of transmitting data from a sender to a receiver over a SCSI data bus, wherein the sender is one of a host computer system and a peripheral device, and the receiver is the other of the host computer system and the peripheral device, comprising the following steps in the sequence set forth:

the sender sending the data as true data onto the data bus;

the sender sending the data as inverted data onto the data bus;

the sender pausing a first predetermined period of time for the inverted data to be set up on the data bus;

the sender sending the data as true data onto the data bus;

the sender pausing a second predetermined period of time for the data to be set up on the data bus;

the sender sending a REQ command associated with the data onto the data bus; and the sender pausing a third predetermined period of time for the REQ command to be set up on the data bus in response to any one of several data transmission conditions on the data bus, and the sender pausing the second predetermined period of time for the REQ command to be set up on the data bus in the absence of the data transmission conditions on the data bus, wherein the third predetermined period of time is substantially longer than the second predetermined period of time.

48. The method of claim 47, wherein the third predetermined period of time is substantially longer than the first predetermined period of time.

49. The method of claim 47, wherein the second predetermined period of time is identical to the first predetermined period of time.

50. The method of claim 47, wherein the sender sending the inverted data and pausing the first predetermined period of time for the inverted data to be set up on the data bus minimizes digital data inter-symbol interference, and the sender sending the true data and pausing the second predetermined period of time for the true data to be set up on the data bus does not minimize digital data inter-symbol interference.

51. The method of claim 47, wherein the sender sending the REQ command and pausing the third predetermined period of time for the REQ command to be set up on the data bus minimizes digital control inter-symbol interference, and the sender sending the REQ command and pausing the second predetermined period of time for the REQ command to be set up on the data bus does not minimize digital control inter-symbol interference.

52. The method of claim 47, wherein the sender pauses for the third predetermined period of time for the REQ command to be set up on the data bus in response to the data bus being idle for a prolonged period of time.

53. The method of claim 47, wherein the sender pauses for the third predetermined period of time for the REQ command to be set up on the data bus in response to an individual line of the data bus being idle for a prolonged period of time during a synchronous data transmission on the data bus.

54. The method of claim 47, wherein the sender pauses for the third predetermined period of time for the REQ command to be set up on the data bus in response to a prolonged synchronous data transmission on the data bus.

55. The method of claim 47, wherein the data bus reaches a quiescent negated voltage level when the data bus is idle for a prolonged period of time.

56. The method of claim 47, wherein the peripheral device is a disk drive.

57. A method for controlling transmission of data from a sender to a receiver via a data bus to minimize digital inter-symbol interference, wherein the data bus comprises a plurality of individual data lines and a data activity detector is connected to the data bus for monitoring data segment transfers on each individual data line of the data bus, comprising the steps of:

(A) executing a start data transfer command;

(B) waiting for a FIFO register at the sender to be holding the data and determining when the FIFO register is holding the data;

(C) driving the data held in the FIFO register onto the data bus;

(D) pausing a first predetermined period of time for the data to be set up on the data bus;

(E) asserting a REQ command associated with the data onto the data bus; and then (F) pausing a second predetermined period of time longer than the first predetermined period of time for the data to be sensed by data detection circuitry in the receiver, wherein pausing for the second predetermined period of time provides the data detection circuitry additional time to sense the data being transmitted on the data bus;

wherein steps (A)–(F) are repeated for each individual data line if the data activity detector determines that any individual data line is inactive for a period of time.

58. The method of claim 57, wherein the data bus is a SCSI data bus.

59. The method of claim 57, wherein the sender is a host computer system and the receiver is a peripheral device.

60. The method of claim 57, wherein the sender is a peripheral device and the receiver is a host computer system.

61. The method of claim 57, wherein the REQ command is replaced with an ACK command and the sender is a host computer system and the receiver is a peripheral device.

* * * * *